(12) United States Patent
Nassiri

(10) Patent No.: US 6,167,584 B1
(45) Date of Patent: Jan. 2, 2001

(54) CLEANING TOOL

(75) Inventor: Hamid Nassiri, Sundbyberg (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 09/253,677

(22) Filed: Feb. 19, 1999

(30) Foreign Application Priority Data

Feb. 20, 1998 (SE) .................................................. 9800513

(51) Int. Cl.⁷ .............................. A47L 13/12; A47L 13/17; A47L 25/00; B08B 1/00
(52) U.S. Cl. .................. 15/104.94; 15/118; 15/210.1; 15/220.4; 401/10; 401/37; 401/196
(58) Field of Search .................................. 15/104.94, 118, 15/210.1, 244.1, 220.4; 401/37, 196, 203, 261, 10

(56) References Cited

U.S. PATENT DOCUMENTS

| | | | |
|---|---|---|---|
| 623,056 | * | 4/1899 | Wellborn ................... 401/37 |
| 1,179,359 | * | 4/1916 | Kennedy ................... 15/118 |
| 2,069,406 | * | 2/1937 | Esch ........................ 15/220.4 |
| 2,622,256 | * | 12/1952 | Vojacek ................... 15/118 |
| 2,715,291 | * | 8/1955 | Sweigert .................. 15/220.4 X |
| 2,908,923 | * | 10/1959 | Schlechter ............... 15/118 X |
| 2,968,056 | * | 1/1961 | Aveni ....................... 15/118 X |
| 3,813,722 | * | 6/1974 | Sapochinik ............... 401/10 X |
| 5,056,180 | * | 10/1991 | Stanton .................... 15/118 |
| 5,461,747 | * | 10/1995 | Clausen et al. .......... 15/210.1 X |

FOREIGN PATENT DOCUMENTS

| | | |
|---|---|---|
| 3341919 | 11/1983 | (DE) . |
| 0 509 737 | 10/1992 | (EP) . |
| 91/13837 | 9/1991 | (WO) . |

OTHER PUBLICATIONS

Abstract for JP 9197156 filed Jul. 31, 1997.

* cited by examiner

Primary Examiner—Mark Spisich
(74) Attorney, Agent, or Firm—Burns, Doane, Swecker & Mathis, L.L.P.

(57) ABSTRACT

A cleaning tool (1) intended primarily for cleaning ends of ribbon fibers (17) is designed as a pair of tweezers. At the free ends of the tweezer legs (3) opposite plush pads (13) and opposite cotton or paper pads (15) are provided. The plush pads (13) can be dipped in alcohol before cleaning the ribbon fiber. Then the alcohol is sucked into and held by the plush cloth, whereas the part of the tool, which comprises the wiping/drying pads (15), remains dry. An end of the ribbon fiber (17) is then moved over the pads first contacting the liquid-containing plush pads (13) and thereafter contacting the adjacent dry pads (15). Using the tool the operations of washing and wiping fibers to make them dry can be executed in a single step and in a secure way, so that no particles and solvent residues remain on the end of the ribbon fiber.

3 Claims, 2 Drawing Sheets

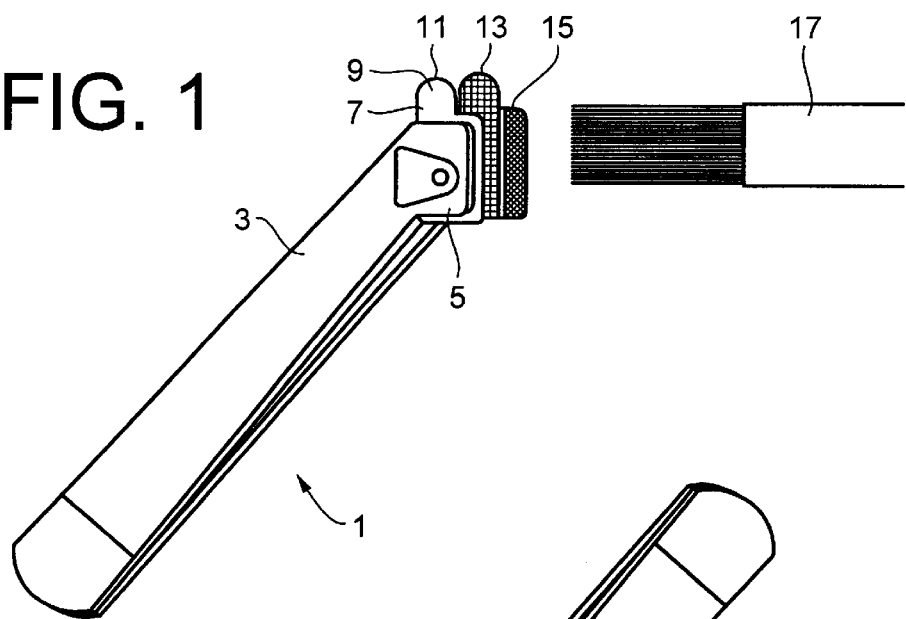
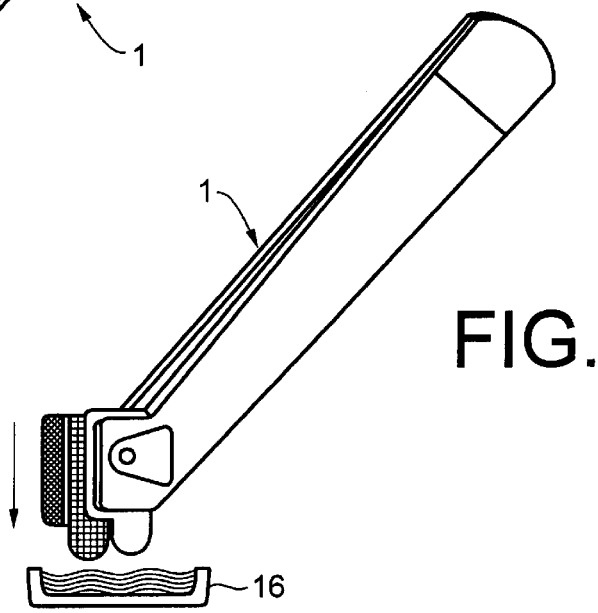
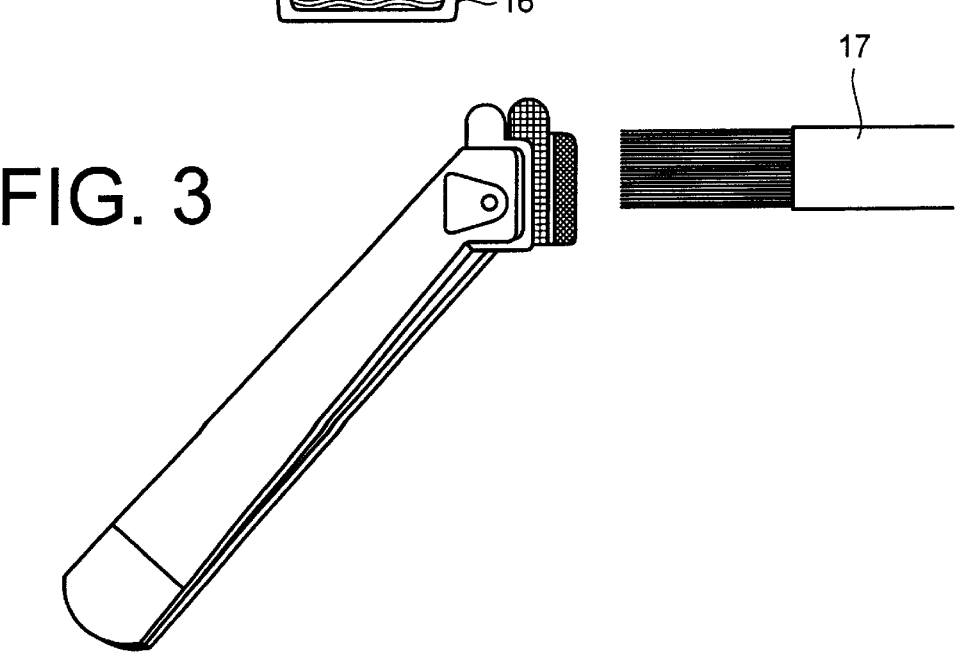

CLEANING TOOL

This application claims priority under 35 U.S.C. §§119 and/or 365 to 9800513-5 filed in Sweden on Feb. 20, 1998; the entire content of which is hereby incorporated by reference.

The present invention relates to a tool for cleaning optical fibers particularly suited for cleaning optical fibers retained to form optical ribbon fibers.

BACKGROUND

Before splicing optical fibers or connecting optical fibers to active/passive components the protective coatings of the optical fibers have to be removed over a distance at the ends of the fibers and then the fibers have to be cut off to produce new, fresh end surfaces, which are flat and located in planes which are accurately perpendicular to the longitudinal direction of the respective fibers. When using in particular optical fibers made of quarts glass, which have protective coatings of polymers, and removing the coatings small particles are formed, which often rather strongly adhere to the fibers and which must be removed before the cutting operation. Otherwise erroneous angles of the planes of the end surfaces can be obtained owing to errors when placing the fibers in the cutting apparatus. Also directly before splicing a cleaning operation can be required. In simple manual cleaning often a suitable cellulose fiber material such as cotton is used, which is moistened with some kind of alcohol and is wiped over the ends of the fibers.

Also specially designed cleaning devices have been proposed. Thus in the West German patent document DE,C1 33 41 919 a manual tool for cleaning optical fibers is disclosed, which have their primary protective coating left but on which dirt particles can remain after removing a secondary protective coating having a filling mass resident therein. The tool consists of a pair opposite cleaning pads of an absorbing material having a flexible pile 6, which is arranged to be folded about a hinge 8, and a container 5 for cleaning liquid. When using the tool, first the pads are impregnated with cleaning liquid from the container 5, after which the fibers are placed on the pad 4 and the pad 3 is folded down and blocked by means of a snap lock 9. The tool is then moved in the longitudinal direction of the fibers.

In the published International patent application WO,A1 91/13837 an automated fiber handling system comprising a station for cleaning fibers is disclosed, see FIGS. 6A–6C. Strips of special paper are moved over rubber pads, impregnated with cleaning liquid from a nozzle and then the opposite rubber pads are pressed to each other, the moistened paper strips then being pressed against the fiber end, which is then moved between the paper strips.

In the Japanese patent application JP,A 9-197 156 a tool for splicing optical fibers is described. In the tool a cleaning part 8 is used for removing dirt before the splicing operation.

These prior constructions perform a cleaning in only one step by bringing an absorbing body holding a cleaning liquid to contact a fiber end. After this contact cleaning liquid can still remain on the fiber end and possibly also particles hold by this liquid.

SUMMARY

It is an object of the present invention to provide a cleaning tool for optical fibers, which in a simple and efficient way can clean an end of an optical fiber.

The problem, which the inventions intends to solve is how an end of an optical fiber will be cleaned by a simple operation, so that effectively all particles are removed and further so that no solvent residues remain on the optical fiber end.

A cleaning tool intended primarily for cleaning ribbon fibers, from which the protective coating has been removed over an end portion, consists of opposite plush pads and opposite cotton or paper pads, which are secured to a base part which can be folded to a closed state. The plush pads are dipped to absorb a cleaning liquid such as an alcohol before the cleaning operation. Then the alcohol is sucked into the plush cloth, while the other pads of the tool comprising hardly pressed cotton or paper, remain dry. An end of an optical fiber is then moved over the two sets of pads, first contacting the moistened plush pads and thereafter contacting the adjacent dry pads. Thereby the washing and drying of optical fibers can be executed in a single step.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1 is a perspective view of a tool for cleaning optical fibers;

FIGS. 2–4 are a sequence of perspective views, which illustrate the use of the tool according to FIG. 1.

DETAILED DESCRIPTION

Figure 4:
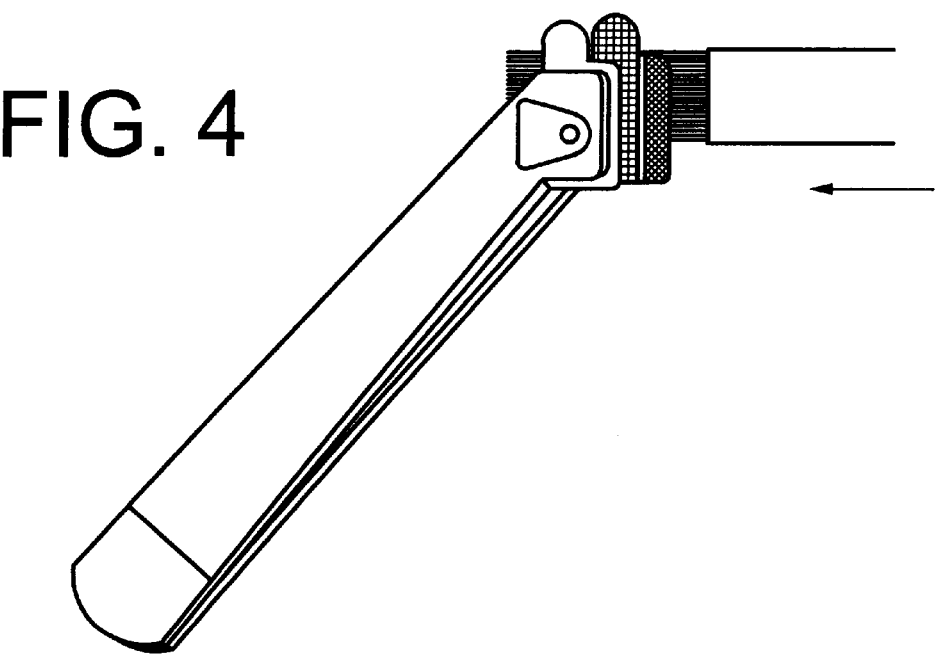

In FIG. 1 a tool for cleaning of optical fibers is shown, which is particularly suited for cleaning ends of optical ribbon fibers, from which protective layers have been removed for performing cutting and splicing operations, connection to devices, etc. The tool is designed as tweezers 1 of metal having two opposite elastic legs 3 of plate material, which are rigidly secured to each other at one of their ends and at their opposite ends are located at some distance from each other. At the free ends of the legs 3 they have a profile to form opposite rectangular plates 5, the sides of which are located in an angle of about 45° in relation to the longitudinal direction of the legs 3. A long side of the rectangular plates 5 connect to the legs 3 of the tweezer 1, so that thus a long side and the two short sides of the rectangular shape are free.

On the inner surfaces of the rectangular plates 5, which face each other, they carry support plates 7 made e.g. of a plastic material such artificial resin. The support plates 7 have a shape, which substantially agrees with the shape of the rectangular plates 5, so that they have a rectangular main part, however, they have at one of their short sides projections 9 having one side aligned with a long side of the rectangular main part of the support plates. The projections 9 are terminated by a rounded-out free edge 11, which for example can be designed as substantially a semicircle. Also the corner at the short side of the main part of the support plates, which carries the projection 9, can be bevelled or rounded out and for example have the shape of a quarter of a circle. The projections 9 protrude from the side or edge of the support plates 7, which is distant from the tweezer legs 3 and thus corresponds to that one of the short sides of the rectangular plates 5 of the tweezer legs 3, which with a side of a leg 3 form an angle larger than 180°, e.g. 225°. This short side thus forms with the side edge of the leg 3 a convex profile, whereas the opposite short side together with the opposite side edge of the leg forms a concave profile. This location make the projections 9 easily available, what is advantageous when using the tool as will described hereinafter.

Each of the support plates 7 in turn carries on its free surface, which face the other support plate, a cleaning pad 13 and a wiping/drying pad 15. The pads 13, 15 have an elongated shape and can be glued to the support plates 7. The cleaning pad 13 is broader than the wiping/drying pad 15, for example having a breadth being twice that of the wiping/drying pads. Typical breadths can be 4 and 2 mm respectively. The pads 13, 15 are located at some distance of each other, so that a free strip-shaped area 17 having a breadth for example corresponding to half that of the wiping/drying pad, i.e. typically 1 mm, is left therebetween. The cleaning pad 13 is arranged at the area of the artificial resin plate 7, which is located closest to the tweezer leg 3, and has one of its longer edges aligned with a long side of the main part of the support plate 7. It extends all along this long side up to the projection 9 which it covers. The cleaning pad 13 has substantially the same breadth as the projection 9 and is at one of its ends rounded out, so that it has a shape adapted to the projection 9. The wiping/drying pad 15 is located at the opposite, outwardly facing and free long side of the main part of the support plate 7 and thus has a long side located aligned with this long side. The wiping/drying pad 15 can have a rounded-out corner to be suited to be placed under the rounded-out corner of the main part of the support plate.

The cleaning pads 13 are made of textile fibers, such as of pile or plush type, for example of silk. The absorption pads are made of cellulose fibers, for example hardly pressed cotton or paper of the type which is used for cleaning camera lenses and similar things. The pads of the two opposite sets can absorb and hold liquid.

Figure 5:
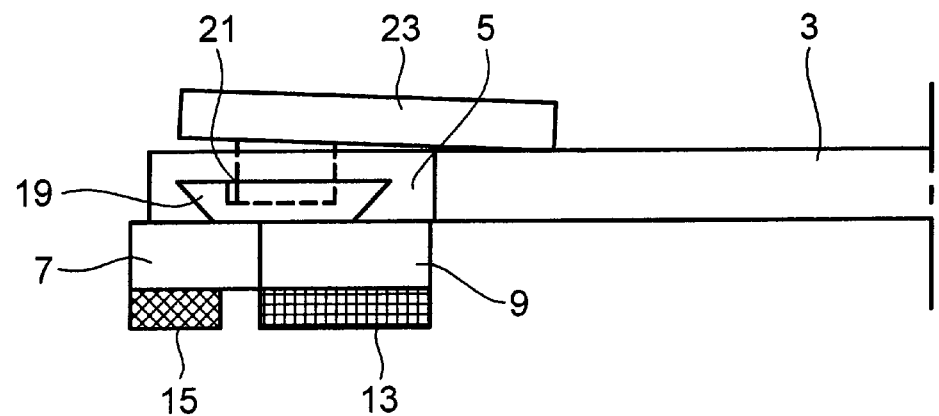
FIG. 5 is a partial side view, which illustrates attachment of a support plate.

The support plates 7 having pads attached thereto can easily be replaced as is illustrated by the side view in FIG. 5. It is seen here, that on the rear side of the support plates 7 they carry projections or ribs 19 which have a dovetail shape and which engages in recesses having a correspondingly designed shape on the inner side of the rectangular plates 5 of the tweezer legs. The ribs 19 extend in parallel to the long sides of the rectangular main part of the rectangular plate parts 5. At the centre of the elongated projections 19 a shallow recess 21 is located, in which a pin on an elastic tongue 23 engages. The elasticity of the tongue 23 and the shapes of the pin and the corresponding recess are such, that only some resistance exists to removing the support plates 7 by moving them in a direction corresponding the longitudinal direction of the ribs 19. A new, non-used support plate 7 is easily mounted by fitting its rib 19 in the corresponding recess 21 in the plate part 5 of a leg 3 and by then forcing the plate in the longitudinal direction of the rib.

The operation of the tool will now be described with reference to FIGS. 2–4. As is illustrated in FIG. 2 the tool 1 is held by an operator, so that the projections 9 of the support plates 7 are directed downwards, and then the tool is moved downwards, so that the projections 9 and then also the rounded-out ends of the cleaning pads 13 are immersed in cleaning liquid filled into a vessel 16. It can easily be made by the fact that the projections 9 are located on a convex outer edge of the tool. The cleaning liquid, typically ethanol or propanol, is sucked into the cleaning pads 13 but not into the wiping/drying pads 15. The tool is now turned, so that the projections 9 point upwards, see FIG. 3. An end portion of an optical ribbon fiber 17, from which protective polymer layers have been removed over a suitably adapted distance, is inserted from the side between the opposite pads 13, 15, so that the ribbon fiber is located approximately perpendicularly to the longitudinal direction of the pads and the wiping/drying pad 15 is located most distant of the end of the ribbon fiber. Thereafter the legs 3 of the tool are pressed to each other by the fingers of the operator, whereby the pads 13, 15 are pressed against a part of the end portion of the ribbon fiber, see FIG. 4. Thereafter the tool and the ribbon fiber are moved in relation to each other, with the tool in a movement towards the end of the ribbon fiber, so that the cleaning pads 13 always first come in contact with a new area of the end portion, which thereby is cleaned, whereas the wiping/drying pads 15 thereafter come in contact with the same area, from which then the remaining liquid is absorbed and dirt particles are wiped away. When the tool 1 has been moved sufficiently long, so that all of the end of the ribbon fiber 17 has been cleaned and wiped to become dry, the cleaning operation is finished.

Here a tool has now been described, which has a simple construction and which in an efficient way can clean an end of an optical fiber, so that possible particles are removed and so that no solvent residues remain on the optical fiber after the cleaning operation.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A cleaning tool for cleaning optical fibers, the cleaning tool comprising:

a base part including two elastic tweezer legs joined at first ends of the tweezer legs and having free second ends located opposite each other and at some distance from each other, two first pads for holding cleaning liquid to moisten surfaces of an optical fiber, and two second pads for wiping the surfaces of the optical fiber, thereby removing dirt and removing and absorbing cleaning liquid to make the surface of the optical fiber dry after passing the second pad, the two first pads and the two second pads arranged to form pairs, each pair comprising an individual one of the first pads and an individual one of the second pads, the pads of each pair attached to inner, opposite surfaces of the free end of an individual one of the tweezer legs, so that the two first pads are located opposite each other and the two second pads are located opposite each other and so that in use the free second ends of the tweezer legs can be moved towards each other to make an optical fiber moved between the free second ends come in contact with the first and second pads, so that surfaces of each optical fiber first come in contact with the first pad of each pair and thereafter with the second pad of each pair.

2. The cleaning tool of claim 1, further comprising a gap between the first pad and the second pad of each pair, so that liquid in the first pad of the pair cannot be sucked directly from the first pad of the pair into the second pad of the pair.

3. The cleaning tool of claim 1, wherein the two first pads have projections, with which they can absorb cleaning liquid from a container or vessel having cleaning liquid disposed in the container or vessel with a free surface of the cleaning liquid by immersing the projection into the cleaning liquid.

* * * * *